(12) United States Patent
Brehmer et al.

(10) Patent No.: US 8,540,066 B2
(45) Date of Patent: Sep. 24, 2013

(54) ROTATIONALLY FIXED CONNECTION OF TWO PARTS OF A TRANSMISSION FOR TRANSMITTING TORQUE

(75) Inventors: Martin Brehmer, Tettnang (DE); Gabor Diosi, Friedrichshafen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 606 days.

(21) Appl. No.: 12/663,173

(22) PCT Filed: May 27, 2008

(86) PCT No.: PCT/EP2008/056454
§ 371 (c)(1),
(2), (4) Date: Dec. 4, 2009

(87) PCT Pub. No.: WO2008/151921
PCT Pub. Date: Dec. 18, 2008

(65) Prior Publication Data
US 2010/0178102 A1 Jul. 15, 2010

(30) Foreign Application Priority Data
Jun. 15, 2007 (DE) .................. 10 2007 028 258

(51) Int. Cl.
*F16D 1/02* (2006.01)
*F16H 57/08* (2006.01)

(52) U.S. Cl.
USPC ......... 192/115; 192/70.16; 192/70.2; 74/449; 403/13

(58) Field of Classification Search
USPC ............... 192/70.16, 115, 70.2; 74/446, 449
See application file for complete search history.

(56) References Cited

U.S. PATENT DOCUMENTS

| | | | | |
|---|---|---|---|---|
| 3,387,481 A | * | 6/1968 | Harvey et al. | 29/509 |
| 3,922,932 A | | 12/1975 | Maurice et al. | |
| 5,367,916 A | * | 11/1994 | Bevc et al. | 74/449 |
| 5,688,177 A | * | 11/1997 | Lindner | 464/68.4 |
| 5,799,766 A | | 9/1998 | Link et al. | |
| 5,909,789 A | * | 6/1999 | Ilzig et al. | 192/115 |
| 5,927,121 A | * | 7/1999 | Rolf et al. | 29/893.32 |
| 6,502,295 B1 | * | 1/2003 | Morgand | 29/509 |
| 6,584,873 B1 | * | 7/2003 | Bonfillio et al. | 464/68.1 |
| 6,699,131 B2 | * | 3/2004 | Jackel et al. | 464/68.9 |
| 6,699,132 B2 | * | 3/2004 | Friedmann et al. | 464/68.8 |
| 6,918,170 B2 | * | 7/2005 | Luthi | 29/509 |
| 7,996,977 B2 | * | 8/2011 | Herb | 29/509 |
| 8,292,747 B2 | * | 10/2012 | Jameson | 464/67.1 |

(Continued)

FOREIGN PATENT DOCUMENTS

| | | |
|---|---|---|
| DE | 71 17 533 U | 5/1972 |
| DE | 25 48 581 A1 | 5/1977 |

(Continued)

*Primary Examiner* — David D Le
*Assistant Examiner* — Jacob S Scott
(74) *Attorney, Agent, or Firm* — Davis & Bujold, PLLC

(57) ABSTRACT

A rotationally fixed connection of first and second components (2, 4) of a transmission (1) for torque transfer. The fixed connection is produced by the combination of two different types of connection elements (6, 7, 8, 9), such that the connection elements (6, 8) of a first type ensures the mutual centering of the first and the second components (2, 4) to be connected and torque transfer, while the connection elements (7, 9) of a second type enable the first and the second components (2, 4) to be axially fixed and transfer axial operating forces.

12 Claims, 8 Drawing Sheets

(56) References Cited

U.S. PATENT DOCUMENTS

| | | |
|---|---|---|
| 2003/0232693 A1 | 12/2003 | Kakamu et al. |
| 2006/0128480 A1 | 6/2006 | Kim et al. |
| 2006/0283684 A1* | 12/2006 | Beerens .................... 192/107 T |

FOREIGN PATENT DOCUMENTS

| | | |
|---|---|---|
| DE | 44 14 384 A1 | 10/1994 |
| DE | 195 18 678 C1 | 10/1996 |
| DE | 197 01 565 A1 | 8/1997 |
| DE | 102 36 677 A1 | 2/2004 |
| DE | 10 2005 001 832 A1 | 8/2006 |
| DE | 20 2006 011 424 U1 | 2/2007 |
| FR | 2 208 473 | 6/1974 |
| WO | 91/01859 A1 | 2/1991 |
| WO | 2006/005128 A1 | 1/2006 |

\* cited by examiner

ROTATIONALLY FIXED CONNECTION OF TWO PARTS OF A TRANSMISSION FOR TRANSMITTING TORQUE

This application is a National Stage completion of PCT/EP2008/056454 filed May 27, 2008, which claims priority from German patent application serial no. 10 2007 028 258.5 filed Jun. 15, 2007.

FIELD OF THE INVENTION

The present invention relates to the rotationally fixed connection of two components of a transmission for torque transfer.

BACKGROUND OF THE INVENTION

Devices for the connection of components are known from automotive technology. For example, from DT 2548581 A1 a tubular plug-type connection is known, which comprises an outer tube expanded to form a socket into which the end of an inner tube is inserted, and which has another socket-shaped expanded section at the end of the socket into which a thrust ring is pressed, which exerts a pressure on a seal located in the socket-shaped expanded section and which is held fast to the socket end by a detent connection. In this device at least two windows distributed uniformly around the ring are provided, in which tabs stamped out of parts of the thrust ring engage, which hold the thrust ring fixed by virtue of their engagement.

Furthermore, from DE 20 2006 011 424 U1 by the present applicant there is known a shift element arrangement, with a cylinder of a first shift element made as a disk carrier and a cylinder of a second shift element made as a disk carrier or belt brake cylinder, such that the cylinder of the first shift element has a hub that can be driven and is mounted on a shaft or on a housing and such that the cylinder of the second shift element encloses the cylinder of the first shift element at least to a large extent. In this known shift element arrangement the cylinder of the second shift element is mounted to rotate on the outer diameter of the cylinder of the first shift element.

SUMMARY OF THE INVENTION

The purpose of the present invention is to indicate a permanent, solid, play-free and rotationally fixed connection between two components of a transmission for torque transfer, by virtue of which torque transfer at high rotational speeds and transmission torques is ensured throughout the service life of the transmission. In addition, the centering action of the connection elements must satisfy strict requirements in relation to running true and imbalance. In particular, the components to be connected are ones with a round cross-section.

Accordingly, a rotationally fixed connection of two components of a transmission for torque transfer is proposed, which comprises two different types of (positively interlocking) connection elements, such that the connection elements of one type ensure the mutual centering of the two components to be joined and the transfer of torque between them, and the connection elements of the other type enable the axial fixing of the two components and the transfer of axial operating forces.

Preferably, the connection elements are arranged radially over the circumference of the mutually opposite sides of the components to be connected.

In particular, it is proposed to form the connection by means of a plurality of coupling elements and rivet studs provided on one of the two components to be connected, with corresponding slots and rivet holes provided on the other component in order to receive the coupling elements and rivet studs. Preferably, the coupling elements and rivet studs are arranged radially around the circumference of the one component to be connected, while the corresponding slots and rivet holes are arranged radially around the circumference of the other component to be connected.

By virtue of the coupling elements provided in accordance with the invention, centering of the two components to be connected is achieved by the tangential surfaces of the coupling elements, and in addition the torque is transferred by the tangential surfaces of the coupling elements. According to the invention the axial fixing of the two components and the transfer of axial operating forces are achieved by the rivet studs.

In a particularly advantageous embodiment of the invention, the components to be connected are made as shaped sheet components, which results in an inexpensive structure.

The coupling elements and rivet studs are produced during the sheet forming by a push-through process. In this, the material is cut on the reverse side of the sheet and then extruded on the opposite side. This produces shaped elements that project out of the sheet surface. According to the invention, the cutouts (i.e. the slots and rivet holes) in the second component are preferably made by stamping (precision cutting).

Alternatively to producing them as shaped sheet components, the components can be made by other production methods such as casting, milling, etc.

According to the invention the tangential play is determined such that having regard to the basic dimensions of the projecting coupling elements and the slots, and to the positional tolerance of these elements in the limiting tolerance case, there is a slight overlap; in addition the rivet studs and the corresponding rivet holes are made with a specified play.

BRIEF DESCRIPTION OF THE DRAWINGS

Below, the invention is explained in more detail as an example with reference to the attached figures, which show.

DETAILED DESCRIPTION OF THE PREFERRED EMBODIMENTS

Figure 1:
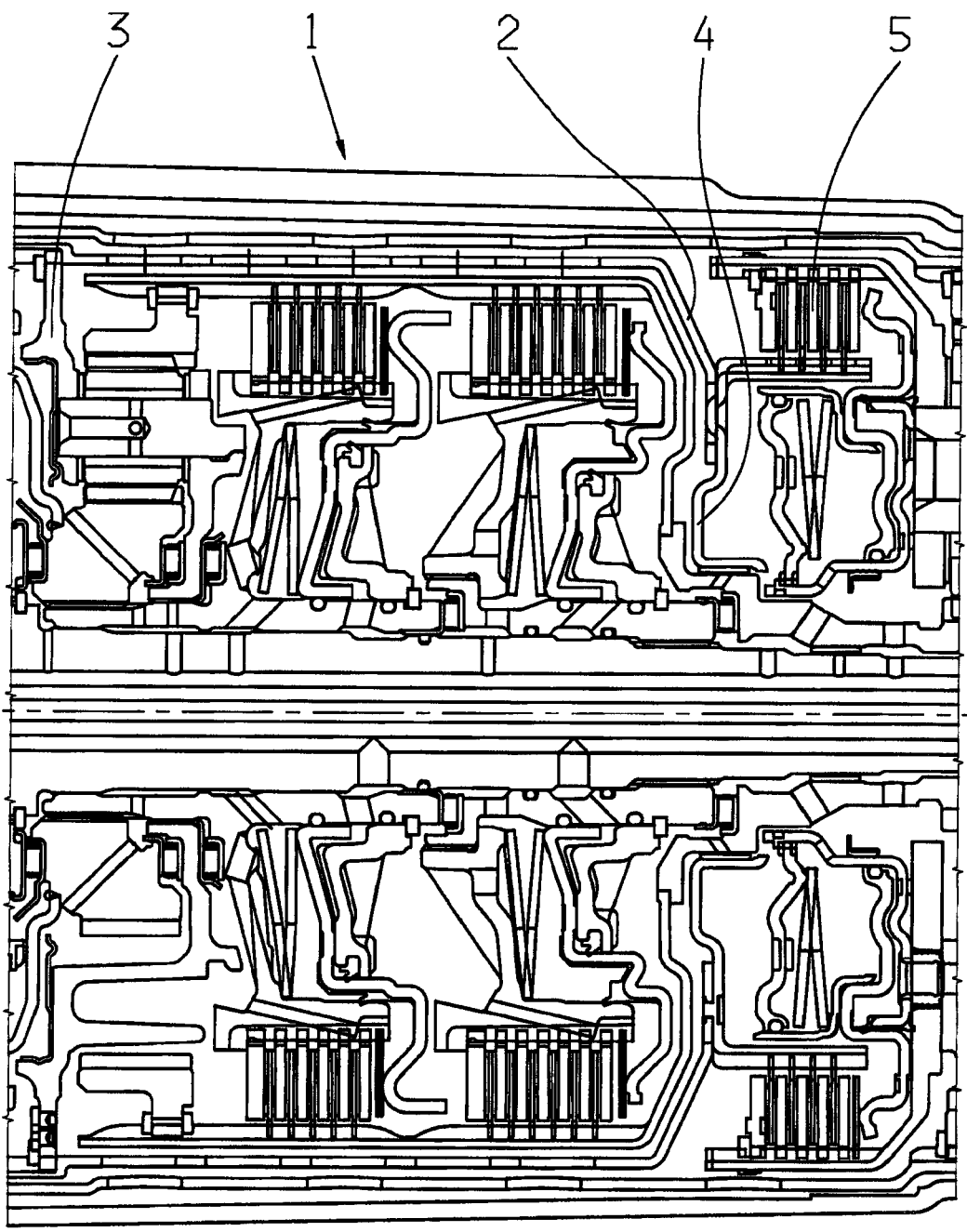
FIG. 1: Sectional view of an automatic transmission of a motor vehicle, in which a pot, which connects the planetary gear carrier of a gearset to an inner disk carrier of a shift element, is connected to the inner disk carrier in accordance with the present invention.

FIG. 1 shows an automatic transmission 1 in which the pot 2, that connects the planetary carrier 3 of a gearset to an inner disk carrier 4 of a shift element 5, is to be connected to the inner disk carrier 4 in accordance with the present invention. For this purpose, according to the invention a plurality of radially arranged, preferably oblong coupling elements and rivet studs are provided on the inner disk carrier 4, which co-operate with corresponding slots and rivet holes in the pot 2 to receive the coupling elements and rivet studs, as illustrated more clearly in FIGS. 2 to 8.

Figure 2:
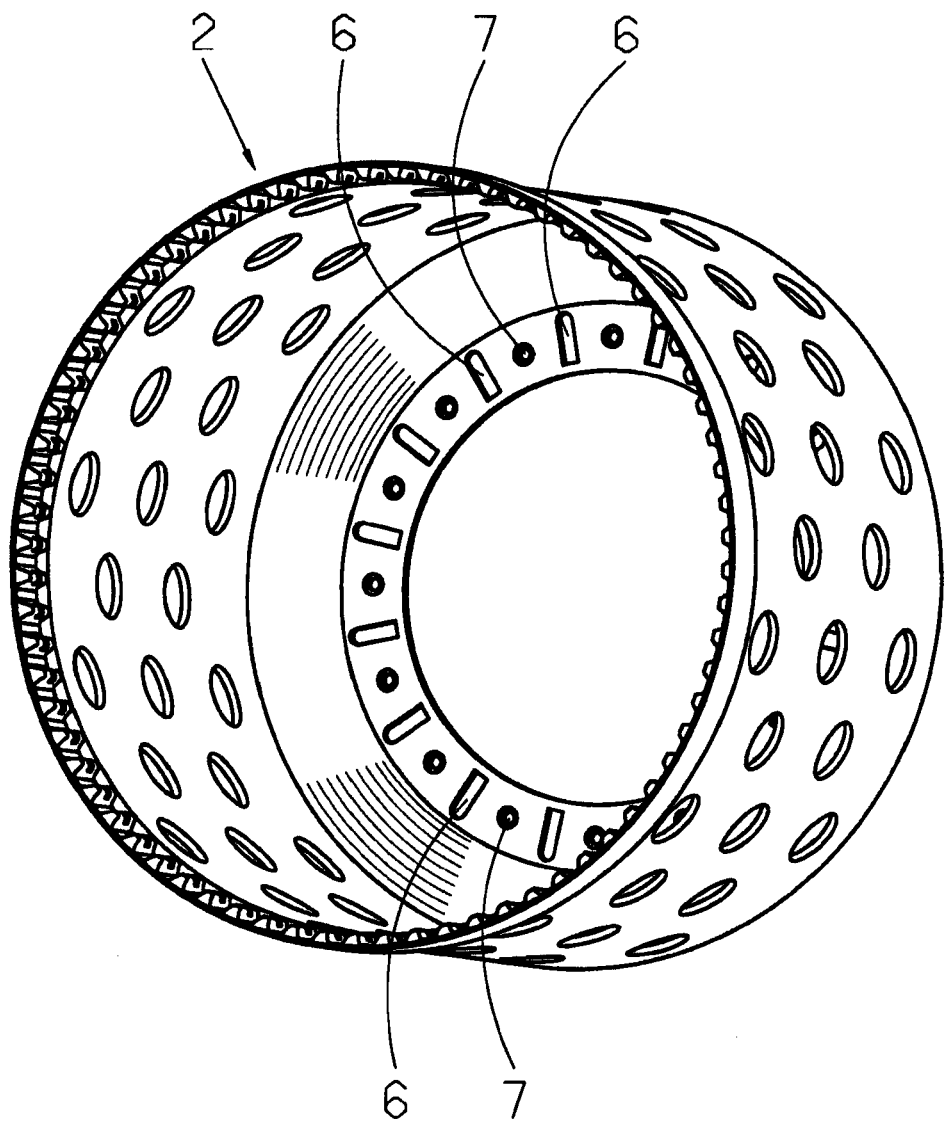
FIG. 2: Perspective inside view of a pot formed according to the invention, which is to be connected to the inner disk carrier from the inside.
Figure 3:
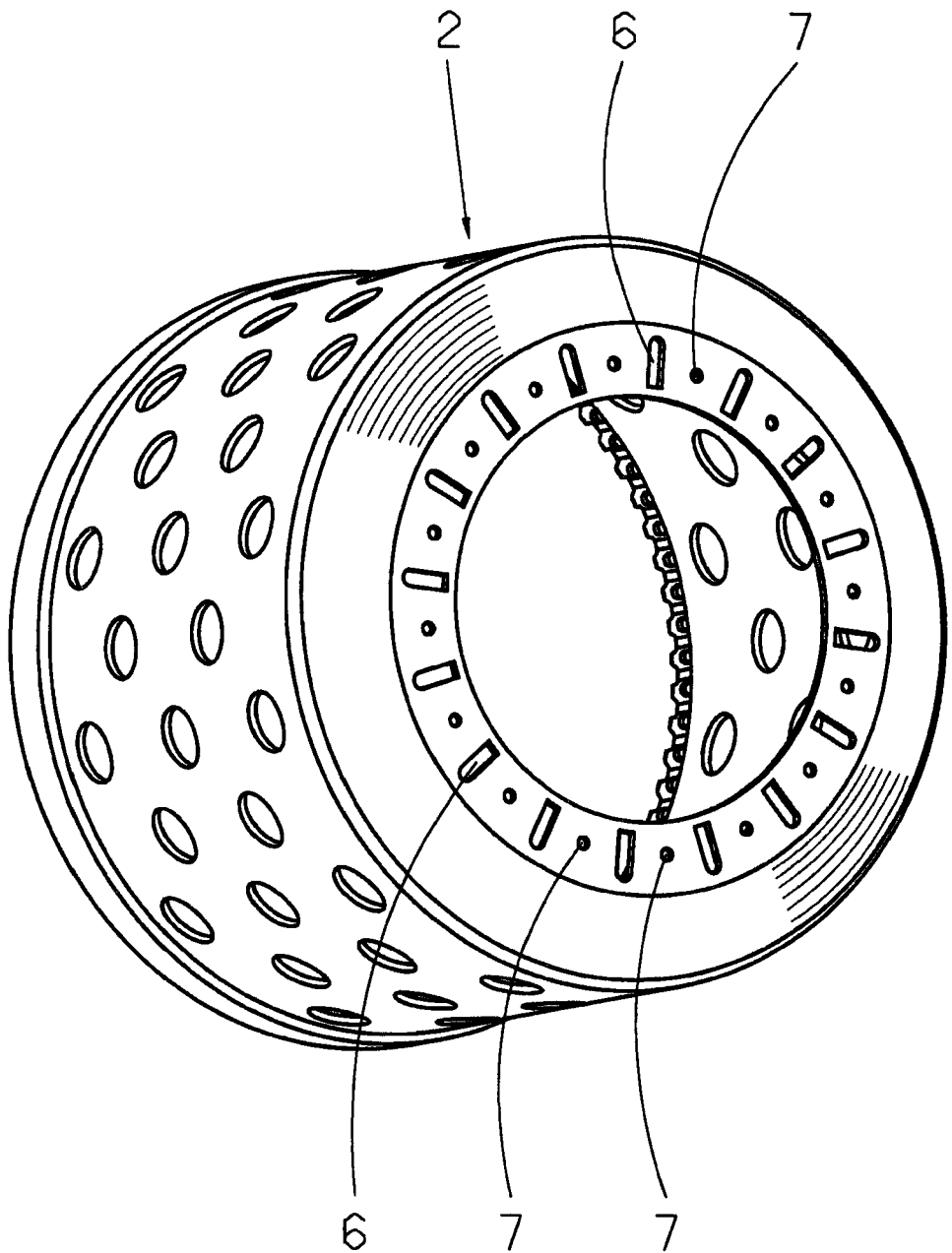
FIG. 3: Perspective outside view of a pot according to the invention, which is to be connected to the inner disk carrier.

FIG. 2 shows a pot 2 made according to the invention, with slots 6 and rivet holes 7 arranged radially around the circumference of the part of the pot 2 that faces toward the inner disk carrier. FIG. 3 shows a perspective view of the pot 2 shown in FIG. 2. The slots 6 and rivet holes 7 are preferably stamped out.

Figure 4:
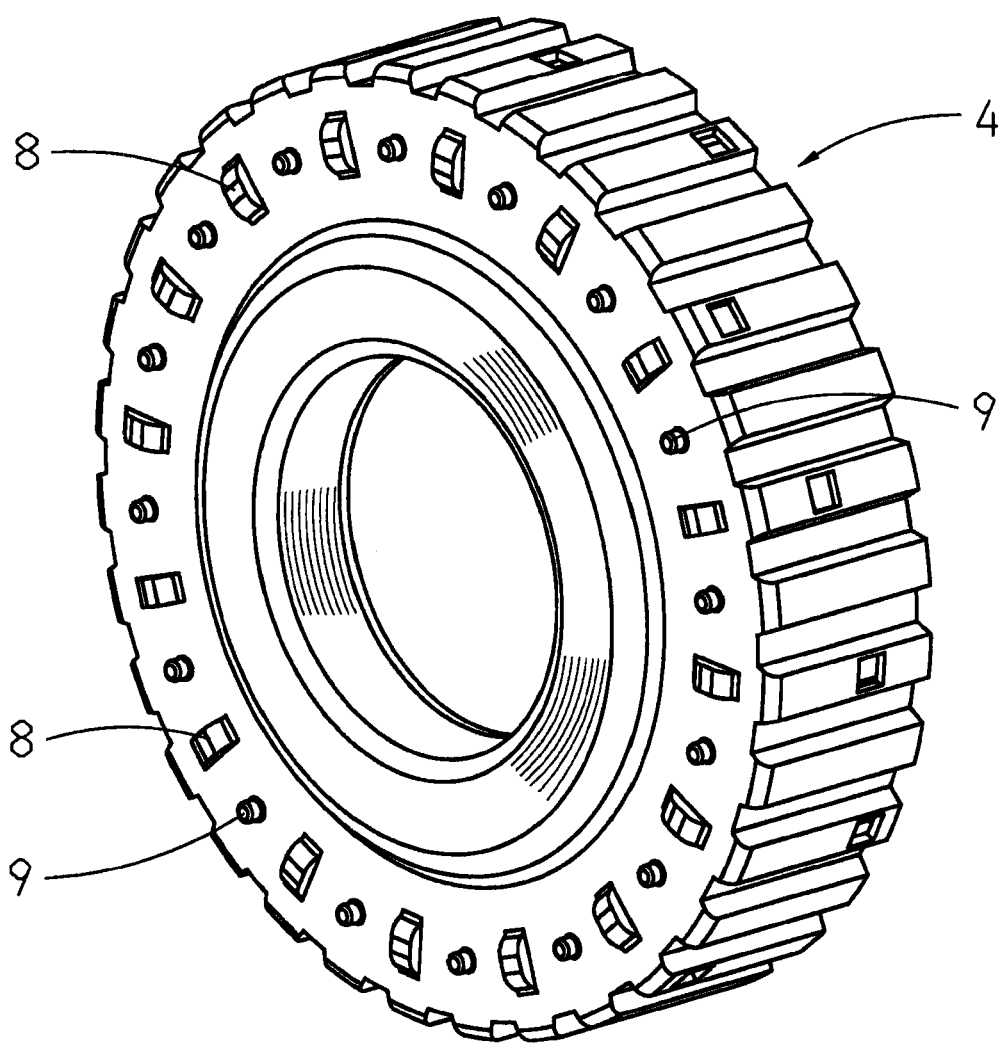
FIG. 4: Perspective outside view of an inner disk carrier formed according to the invention, which is to be connected to the pot.
Figure 5:
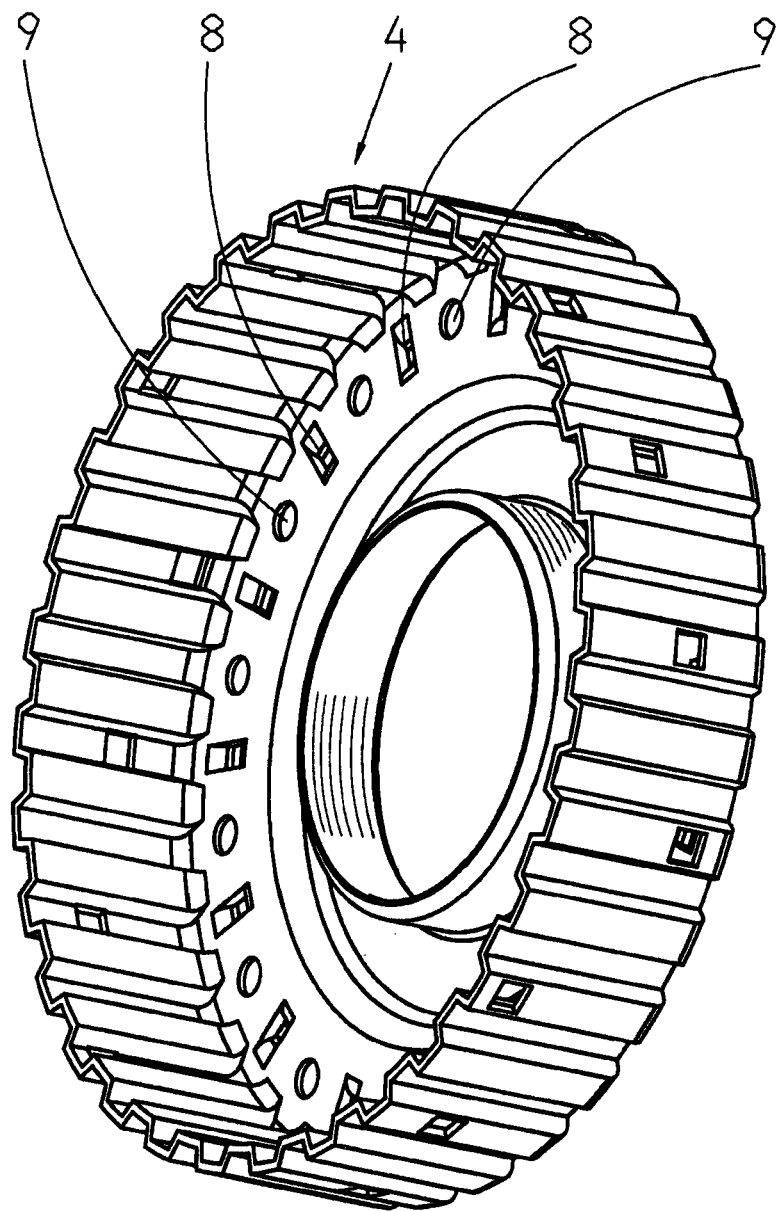
FIG. 5: Perspective inside view of an inner disk carrier formed according to the invention, which is to be connected to the pot.

The object of FIG. 4 is a perspective view of the inner disk carrier 4 made according to the invention, seen from outside; FIG. 5 shows a perspective inside view of the inner disk carrier 4. As can be seen from FIGS. 4 and 5, on the side of the inner disk carrier 4 to be connected to the pot 2 a plurality of projecting coupling elements 8 and rivet studs 9 are provided, which co-operate with the slots 6 and rivet holes 7 provided in the pot 2 to form the connection.

The coupling elements 8 and rivet pins 9 are preferably formed during a sheet forming stage by a push-through process, in which the material is cut on the reverse side of the sheet and extruded on the opposite side, to produce the coupling elements 8 and rivet studs 9 that project from the surface of the sheet.

Figure 6:
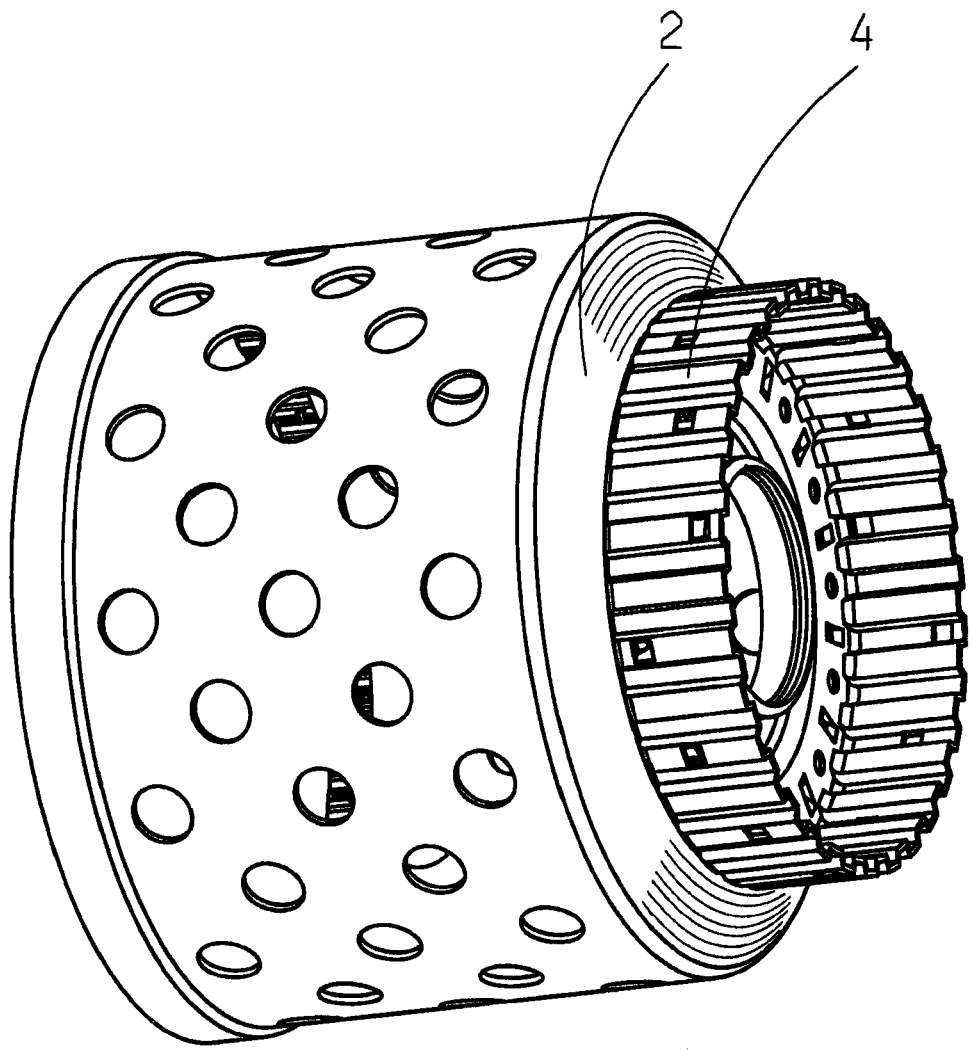
FIG. 6: Perspective inside view of the pot and of an inner disk carrier connected to the pot in accordance with the invention.

FIG. 6 shows the pot 2 connected to the inner disk carrier 4. According to the invention the connection is formed by axially joining the components to be connected and riveting the rivet studs, whereby the two components are fixed axially and axial operating forces are transferred. According to the invention, the tangential surfaces of the coupling elements ensure that the two components being joined are mutually centered and that torque is transferred.

Figure 7:
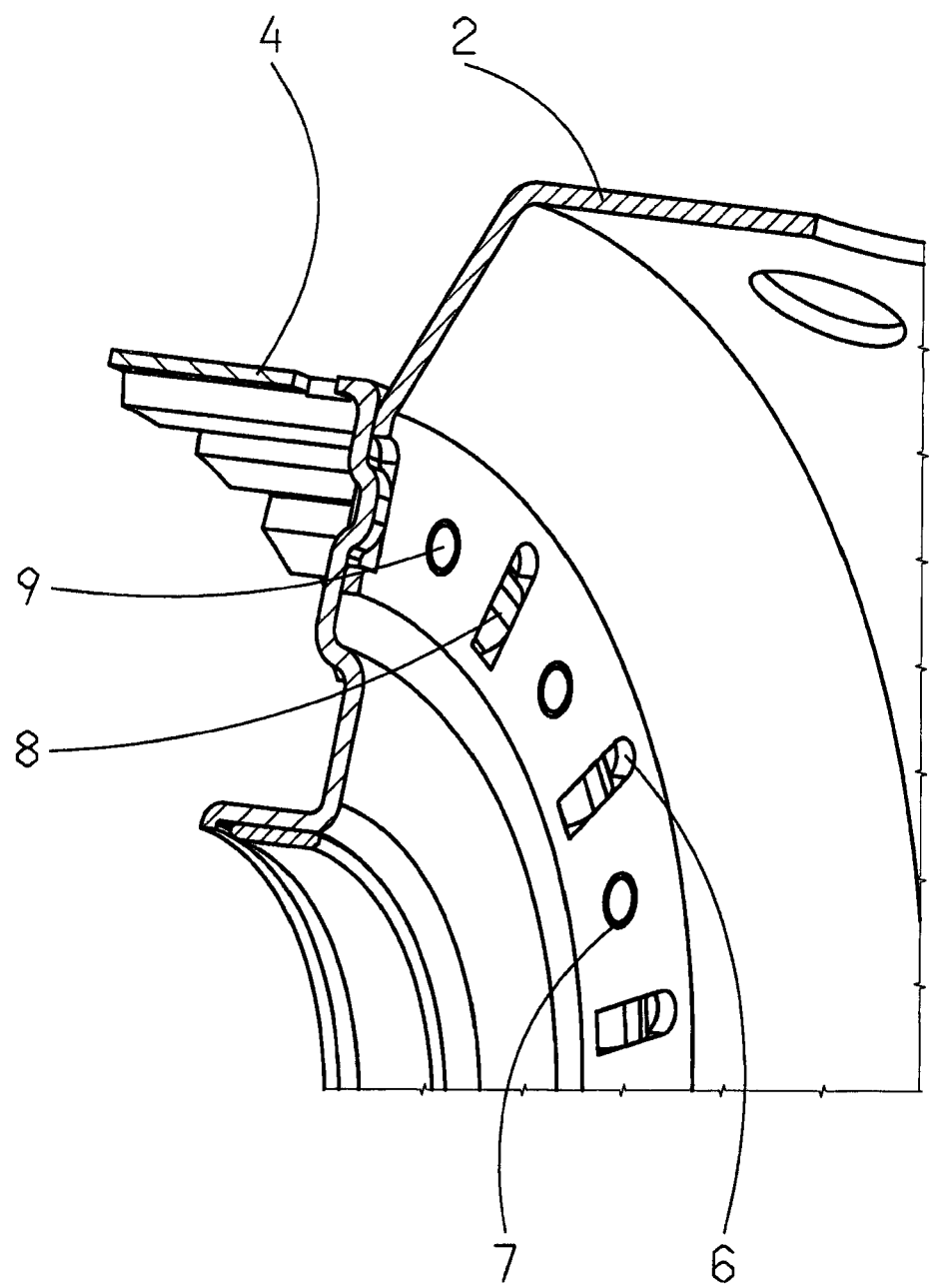
FIG. 7: Perspective view showing a detail of the connection between the pot and the inner disk carrier.
Figure 8:
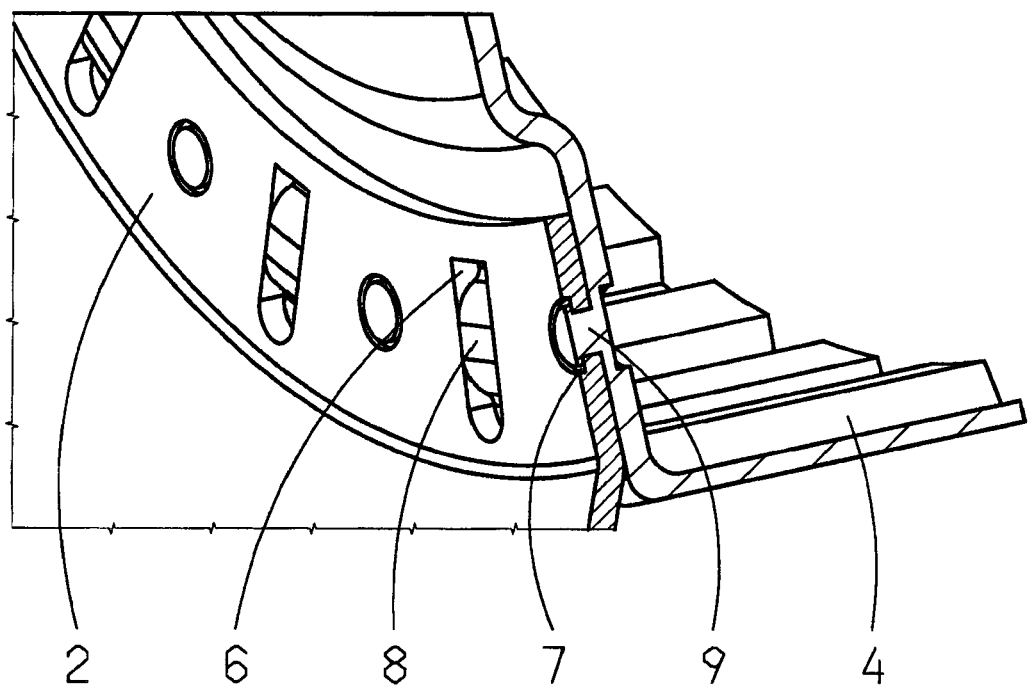
FIG. 8: Perspective view showing a detail of the connection between the pot and the inner disk carrier.

The connection between the pot 2 and the inner disk carrier 4 is shown in more detail in FIGS. 7 and 8. According the invention the tangential play is designed such that having regard to the basic dimensions of the projecting coupling elements 8 and the slots 6, and to the positional tolerance of the coupling elements 8 and the slots 6 in the limiting tolerance case, there is a slight overlap. It is particularly advantageous for the rivet studs 9 and the corresponding rivet holes 7 to have a specified play.

As can be seen in FIG. 8, the rivet studs 9 are riveted to produce flat heads and the coupling elements 8 are sized such that after the connection between the two components to be joined has been made, they do not stick out.

The concept according to the invention provides an inexpensive, permanent, solid, play-free and rotationally fixed connection between two components of a transmission for torque transfer, which ensures torque transfer at high speeds and torques throughout the service life of the transmission. Advantageously, the connection has an effective centering action which satisfies requirements in relation to running time and imbalance.

INDEXES

1. Automatic transmission
2. Pot
3. Planetary gear carrier
4. Inner disk
5. Shift element
6. Slot
7. Rivet hole
8. Coupling element
9. Rivet stud

The invention claimed is:

1. A rotationally fixed connection of first and second components (2, 4) of a transmission (1) for torque transfer, the first and second components (2, 4) being coupled to one another by mating base surfaces supporting the rotationally fixed connection, and the first and second components (2, 4) each comprising a cylindrical section which extends away from the mating base surfaces, the cylindrical section of the first component extends in a first axial direction and the cylindrical section of the second component extends in a second axial direction opposite the first axial direction and the rotationally fixed connection comprising:

a combination of a mating pair of a first type of connection elements (6, 8) and a mating pair of a different second type of connection elements (7, 9), the mating first type of connection elements (6, 8) ensuring torque transfer and mutual centering of the first and the second components (2, 4) to be connected, but without restraining the first and the second components (2, 4) from axially separating from one another, while the mating second type of connection elements (7, 9) enabling axial fixing of the first and the second components (2, 4) to prevent axial separation of the first and the second components (2, 4) from one another and transfer of axial operating forces, a plurality of first members (6) of the first type of connection elements and a plurality of first members (7) of the second type of connection elements both being formed integrally with a first one of the first and the second components (2, 4), and a plurality of mating second members (8) of the first type of connection elements and a plurality of mating second members (9) of the second type of connection elements both being formed integrally with a second one of the first and the second components (2, 4).

2. The rotationally fixed connection of the first and the second components (2, 4) of the transmission (1) for torque transfer according to claim 1, wherein the plurality of first members (6) of the first type of connection elements and the plurality of first members (7) of the second type of connection elements are arranged radially around a circumference of the mating base surface of the first component (2) and the plurality of mating second members (8) of the first type of connection elements and the plurality of mating second members (9) of the second type of connection elements are arranged on the mating base surface of the second component (4).

3. The rotationally fixed connection of the first and the second components (2, 4) of the transmission (1) for torque transfer according to claim 1, wherein the plurality of mating second members (8) of the first type of connection elements and the plurality of mating second members (9) of the second type of connection elements respectively comprise a plurality of coupling elements (8) and rivet studs (9), while the plurality of first members (6) of the first type of connection elements and the plurality of first members (7) of the second type of connection elements respectively comprise corresponding slots (6) and rivet holes (7) for receiving the coupling elements (8) and the rivet studs (9) such that the connection is produced by axially joining the first and the second components (2, 4) to be connected and riveting the rivet studs (9), and mutual centering of the first and the second components (2, 4) to be connected is ensured by tangential surfaces of the coupling elements (8) and the axial fixing of the first and the second components (2, 4) and transfer of axial operating forces being effected by the rivet studs (9).

4. The rotationally fixed connection of the first and the second components (2, 4) of the transmission (1) for torque transfer according to claim 3, wherein the rivet studs (9) are riveted to produce flat heads and the coupling elements (8) are sized so that, after forming the connection between the first and the second components (2, 4) to be connected, the coupling elements (8) do not project out of the corresponding slots (6).

5. The rotationally fixed connection of the first and the second components (2, 4) of the transmission (1) for torque transfer according to claim 3, wherein a radial length of the slots (6) is longer than a radial length of the coupling elements (8).

6. The rotationally fixed connection of the first and the second components (2, 4) of the transmission (1) for torque transfer according to claim 3, wherein, in the assembled condition, the rivet studs (9) and the corresponding rivet holes (7) have play.

7. The rotationally fixed connection of the first and the second components (2, 4) of the transmission (1) for torque transfer according to claim 3, wherein the first and the second components to be connected are both formed from a sheet material.

8. The rotationally fixed connection of the first and the second components (2, 4) of the transmission (1) for torque transfer according to claim 7, wherein the coupling elements (8) and the rivet studs (7) are produced during a sheet forming stage by a push-through process such that material is cut on a reverse side of a sheet and pushed through to an opposite side.

9. The rotationally fixed connection of the first and the second components (2, 4) of the transmission (1) for torque transfer according to claim 7, wherein the slots (6) and the rivet holes (7) are both stamped.

10. The rotationally fixed connection of the first and the second components (2, 4) of the transmission (1) for torque transfer according to claim 1, wherein the first type of connection elements (6, 8) form-primary connection elements for transferring torque between the first and the second components (2, 4) to be connected.

11. A rotationally fixed joint for transferring torque within a transmission (1), the joint comprising:
 a first component (2) comprising a cylindrically shaped wall extending in a first axial direction and a base surface with a plurality of slots (6) and a plurality of rivet holes (7), the plurality of slots (6) and the plurality of rivet holes (7) being alternately, uniformly, radially arranged about a circumference of the base surface of the first component (2);
 a second component (4) comprising a cylindrically shaped wall extending in a second axial direction opposite the first axial direction and a base surface with a plurality of coupling elements (8) and a plurality of rivet studs (9), the plurality of coupling elements (8) and the plurality of rivet studs (9) extending from an exterior face of the base surface of the second component (4) and being alternately, uniformly, radially arranged about a circumference of the base surface of the second component (4);
 the base surface of the first component (2) being coaxially aligned with the base surface of the second component (4) such that an exterior face of the base surface of the first component (2) abuts the exterior face of the base surface of the second component (4) and each of the plurality of the slots (6) receives and engages an associated one of the plurality of the coupling elements (8) and each of the plurality of the rivet holes (7) receives and engages an associated one of the plurality of the rivet studs (9); and
 engagement between each of the plurality of the slots (6) and the associated one of the plurality of the coupling elements (8) facilitates coaxial alignment of and torque transfer between the first component (2) and the second component (4), and the engagement between each of the plurality of the rivet holes (7) and the associated one of the plurality of the rivet studs (9) facilitates axial coupling of and transfer of axial forces between the first component (2) and the second component (4).

12. The rotationally fixed joint according to claim 11, wherein at least one coupling element (8) is positioned at substantially a midpoint between an adjacent pair of rivet studs (9) and at least one rivet stud (9) is positioned at substantially a midpoint between an adjacent pair of coupling elements (8).

\* \* \* \* \*